United States Patent
Goldfarb et al.

(10) Patent No.: US 12,381,862 B2
(45) Date of Patent: Aug. 5, 2025

(54) SYSTEM AND METHOD FOR INTERMEDIATING CELLULAR VOICE COMMUNICATION

(71) Applicant: Cognyte Technologies Israel Ltd., Herzliya (IL)

(72) Inventors: Eithan Goldfarb, Herzliya (IL); Constantin Tanasa, Herzliya (IL); Tymofii Brezhniev, Herzliya (IL); Eleftherios Georgiou, Herzliya (IL); Styliani Agathokleous, Herzliya (IL); Georgios Saridis, Herzliya (IL)

(73) Assignee: COGNYTE TECHNOLOGIES ISRAEL LTD. (IL)

( * ) Notice: Subject to any disclaimer, the term of this patent is extended or adjusted under 35 U.S.C. 154(b) by 137 days.

(21) Appl. No.: 18/199,924

(22) Filed: May 20, 2023

(65) Prior Publication Data

US 2023/0412576 A1 Dec. 21, 2023

(30) Foreign Application Priority Data

May 23, 2022 (IL) .......................................... 293270

(51) Int. Cl.
*H04L 9/40* (2022.01)
*H04W 8/04* (2009.01)

(52) U.S. Cl.
CPC ............... *H04L 63/06* (2013.01); *H04W 8/04* (2013.01)

(58) Field of Classification Search
CPC .............. H04L 63/06; H04W 36/0022; H04W 36/00224; H04W 36/0226; H04W 36/0066; H04W 36/14; H04W 8/04
See application file for complete search history.

(56) References Cited

U.S. PATENT DOCUMENTS

| | | | |
|---|---|---|---|
| 8,327,435 B2 * | 12/2012 | Bogineni | H04L 63/102 713/168 |
| 2007/0191056 A1 * | 8/2007 | Karaoguz | H04W 88/06 455/552.1 |

(Continued)

OTHER PUBLICATIONS

Meyer U et al: "On the impact of GSM encryption and man-in-the-middle attacks on the security of interoperating GSM/UMTS networks", Personal, Indoor and Mobile Radio Communications, 2004. PIMRC 2004. 15 Th IEEE International Symposium on Barcelona, Spain Sep. 5-8, 2004, Piscataway, NJ, USA,IEEE, Piscataway, NJ, USA, vol. 4, Sep. 5, 2004 (Sep. 5, 2004), pp. 2876-2883.

(Continued)

Primary Examiner — Jonathan A Bui
(74) Attorney, Agent, or Firm — ISUS INTELLECTUAL PROPERTY PLLC; Anthony Jason Mirabito

(57) ABSTRACT

A system including a transceiver, a modem, and a processor. The processor is configured to cause the transceiver to imitate a base transceiver station (BTS) such that a mobile communication terminal disconnects from an $N^{th}$-generation mobile communication network, which uses an $N^{th}$-generation communication standard, and connects to the transceiver. The processor is further configured to cause the terminal to switch to the $P^{th}$-generation communication standard, and to cause the modem to impersonate the terminal with respect to an $M^{th}$-generation mobile communication network. The processor is further configured to intermediate voice communication between the terminal and the $M^{th}$-generation mobile communication network exchanged between the modem and the $M^{th}$-generation mobile communication network.

16 Claims, 3 Drawing Sheets

(56) References Cited

U.S. PATENT DOCUMENTS

| | | | | |
|---|---|---|---|---|
| 2008/0181179 A1* | 7/2008 | Karaoguz | ............... | H04W 8/20 |
| | | | | 370/331 |
| 2010/0048172 A1* | 2/2010 | Karaoguz | ............. | H04W 48/08 |
| | | | | 455/411 |
| 2019/0306720 A1 | 10/2019 | Nakarmi et al. | | |
| 2020/0178139 A1* | 6/2020 | Shimojou | ............. | H04W 36/12 |
| 2020/0382322 A1 | 12/2020 | Goldfarb | | |
| 2024/0236878 A1* | 7/2024 | Abebe | ................. | H04W 52/146 |

OTHER PUBLICATIONS

Abdul Bais et al: "Evaluation of UMTS security architecture and services", Industrial Informatics, 2006 IEEE International Conference on, IEEE, PI, Aug. 1, 2006 (Aug. 1, 2006), pp. 570-575.
Extended Search Report—European Patent Application No. 23174805.4, dated Jul. 24, 2023, 12 pages.

\* cited by examiner

SYSTEM AND METHOD FOR INTERMEDIATING CELLULAR VOICE COMMUNICATION

FIELD OF THE DISCLOSURE

The present disclosure is related to the field of communication monitoring.

BACKGROUND OF THE DISCLOSURE

Interrogation devices that solicit mobile communication terminals by imitating the operation of a legitimate base station are sometimes referred to as "International Mobile Subscriber Identity (IMSI) catchers."

SUMMARY OF THE DISCLOSURE

There is provided, in accordance with some embodiments of the present invention, a system including a transceiver, a modem, and a processor. The processor is configured to cause the transceiver to imitate a base transceiver station (BTS) such that a mobile communication terminal disconnects from an $N^{th}$-generation mobile communication network, which uses an $N^{th}$-generation communication standard, and connects to the transceiver. The processor is further configured to obtain one or more $M^{th}$-generation keys used by the terminal to communicate in accordance with an $M^{th}$-generation communication standard, M being less than or equal to N. The processor is further configured to cause the terminal to switch to the $M^{th}$-generation communication standard, provided M<N, subsequently to the terminal connecting to the transceiver. The processor is further configured to compute one or more $P^{th}$-generation keys, which are used by the terminal to communicate in accordance with a $P^{th}$-generation communication standard, from the $M^{th}$-generation keys, P being greater than M and greater than or equal to N. The processor is further configured to cause the terminal to switch to the $P^{th}$-generation communication standard, subsequently to computing the $P^{th}$-generation keys, and to cause the modem to impersonate the terminal with respect to the $M^{th}$-generation mobile communication network. The processor is further configured to intermediate voice communication between the terminal and the $M^{th}$-generation mobile communication network by, using the $M^{th}$-generation keys, encrypting and decrypting $M^{th}$-generation packets of the voice communication exchanged between the modem and the $M^{th}$-generation mobile communication network, and using the $P^{th}$-generation keys, encrypting and decrypting $P^{th}$-generation packets of the voice communication exchanged between the terminal and the transceiver.

In some embodiments, M=N, and the $M^{th}$-generation communication standard is the $N^{th}$-generation communication standard.

In some embodiments, P=N, and the $P^{th}$-generation communication standard is the $N^{th}$-generation communication standard.

In some embodiments,
M=2 such that the $M^{th}$-generation network is a second-generation (2G) network and the $M^{th}$-generation keys include a 2G Session Key (Kc), and
the processor is configured to obtain the 2G keys by cryptanalysis of encrypted 2G communication from the terminal to the transceiver.

In some embodiments, the processor is configured to obtain the $M^{th}$-generation keys by:

receiving, via a Signaling System 7 (SS7) network, a plurality of authentication vectors that were assigned, by a Home Location Register (HLR) server serving the $M^{th}$-generation mobile communication network, to the terminal in response to the modem impersonating the terminal, and
by correlating between the authentication vectors and an authentication challenge received by the modem from the $M^{th}$-generation mobile communication network, deriving the $M^{th}$-generation keys from the authentication vectors.

In some embodiments, M=3 such that the $M^{th}$-generation network is a third-generation (3G) network and the $M^{th}$-generation keys include a 3G Cipher Key (CK) and a 3G Integrity Key (IK).

In some embodiments, the processor is further configured to, while intermediating the voice communication, using the transceiver, intermediate data communication between the terminal and a computer network.

In some embodiments, P−M>1, and the processor is further configured to, prior to causing the terminal to switch to the $P^{th}$-generation communication standard, cause the terminal to switch to an $L^{th}$-generation communication standard, L being greater than M and less than P.

There is further provided, in accordance with some embodiments of the present invention, a method including causing a transceiver to imitate a base transceiver station (BTS) such that a mobile communication terminal disconnects from an $N^{th}$-generation mobile communication network, which uses an $N^{th}$-generation communication standard, and connects to the transceiver. The method further includes obtaining one or more $M^{th}$-generation keys used by the terminal to communicate in accordance with an $M^{th}$-generation communication standard, M being less than or equal to N. The method further includes, subsequently to the terminal connecting to the transceiver, provided M<N, causing the terminal to switch to the $M^{th}$-generation communication standard. The method further includes computing one or more $P^{th}$-generation keys, which are used by the terminal to communicate in accordance with a $P^{th}$-generation communication standard, from the $M^{th}$-generation keys, P being greater than M and greater than or equal to N. The method further includes, subsequently to computing the $P^{th}$-generation keys, causing the terminal to switch to the $P^{th}$-generation communication standard, and causing a modem to impersonate the terminal with respect to the $M^{th}$-generation mobile communication network. The method further includes intermediating voice communication between the terminal and the $M^{th}$-generation mobile communication network by, using the $M^{th}$-generation keys, encrypting and decrypting $M^{th}$-generation packets of the voice communication exchanged between the modem and the $M^{th}$-generation mobile communication network, and using the $P^{th}$-generation keys, encrypting and decrypting $P^{th}$-generation packets of the voice communication exchanged between the terminal and the transceiver.

There is further provided, in accordance with some embodiments of the present invention, a computer software product including a tangible non-transitory computer-readable medium in which program instructions are stored. The instructions, when read by a processor, cause the processor to cause a transceiver to imitate a base transceiver station (BTS) such that a mobile communication terminal disconnects from an $N^{th}$-generation mobile communication network, which uses an $N^{th}$-generation communication standard, and connects to the transceiver. The instructions further cause the processor to obtain one or more $M^{th}$- generation keys used by the terminal to communicate in accordance with an $M^{th}$-generation communication standard, M being less than or equal to N. The instructions further cause the processor to cause the terminal to switch to the $M^{th}$-generation communication standard, provided M<N, subsequently to the terminal connecting to the transceiver. The instructions further cause the processor to compute one or more $P^{th}$-generation keys, which are used by the terminal to communicate in accordance with a $P^{th}$-generation communication standard, from the $M^{th}$-generation keys, P being greater than M and greater than or equal to N. The instructions further cause the processor to cause the terminal to switch to the $P^{th}$-generation communication standard, subsequently to computing the $P^{th}$-generation keys, and to cause a modem to impersonate the terminal with respect to the $M^{th}$-generation mobile communication network. The instructions further cause the processor to intermediate voice communication between the terminal and the $M^{th}$-generation mobile communication network by, using the $M^{th}$-generation keys, encrypting and decrypting $M^{th}$-generation packets of the voice communication exchanged between the modem and the $M^{th}$-generation mobile communication network, and using the $P^{th}$-generation keys, encrypting and decrypting $P^{th}$-generation packets of the voice communication exchanged between the terminal and the transceiver.

The present disclosure will be more fully understood from the following detailed description of embodiments thereof, taken together with the drawings, in which:

DETAILED DESCRIPTION OF EMBODIMENTS

Overview

Figure 1:
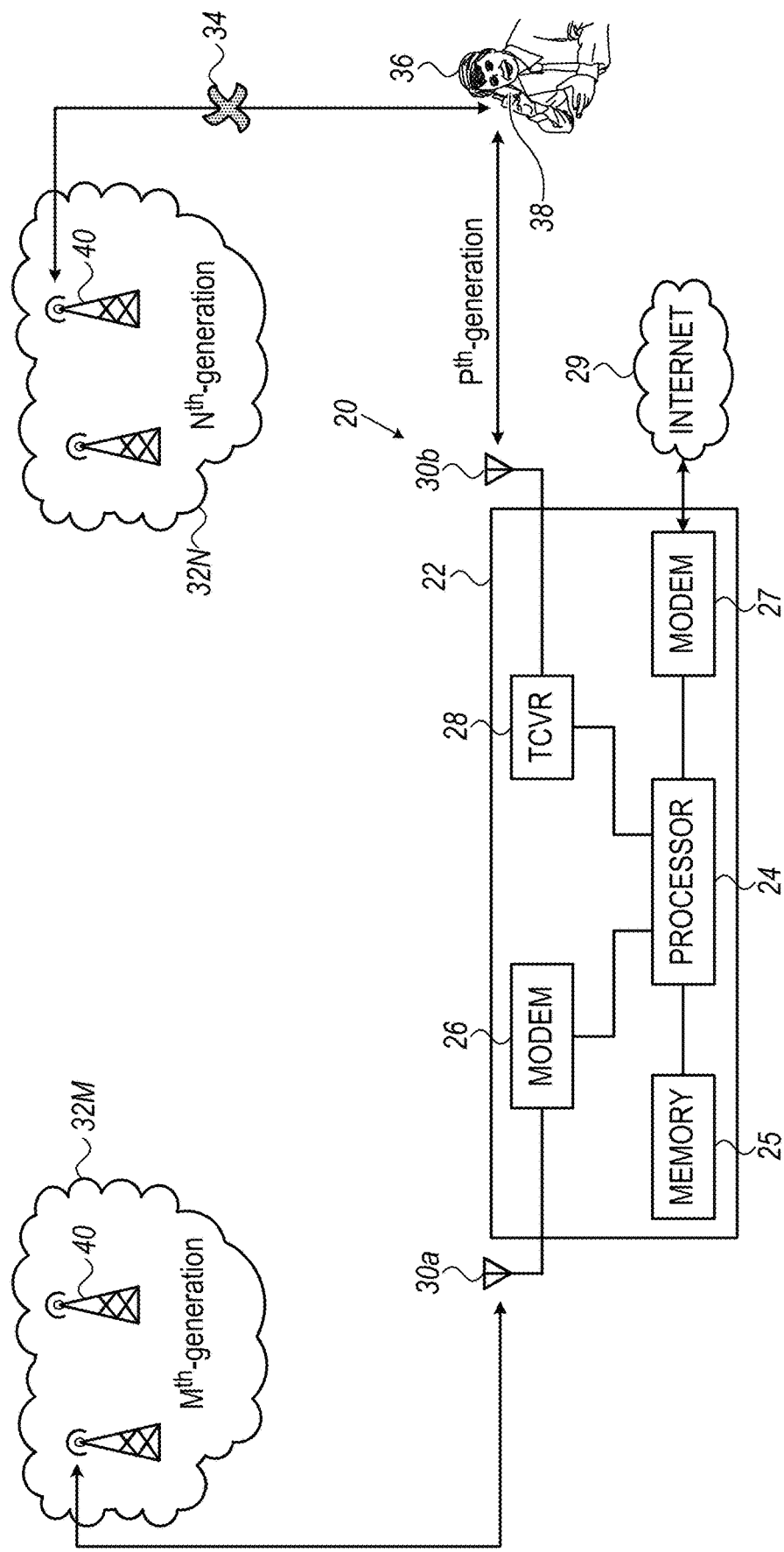
FIG. 1 is a schematic illustration of a system for intermediating cellular voice communication, in accordance with some embodiments of the present disclosure.

In some cases, a law-enforcement agency may wish to monitor cellular voice communication exchanged with a particular mobile communication terminal. However, the terminal may use a relatively advanced communication standard utilizing sophisticated encryption techniques.

One option is to capture the terminal using an interrogation device, and to then switch the terminal to a lower-generation communication standard in which the encryption can be broken. After breaking the encryption, the interrogation device may intermediate voice communication between the terminal and a lower-generation cellular network, such that the communication may be monitored. However, the user of the terminal may notice that the terminal is using the lower-generation standard, due to inferior performance (e.g., lower data rates) of the lower-generation standard. The user might then ascertain that the terminal was captured.

To solve this problem, after obtaining the encryption key(s) for the lower-generation standard, the terminal may be switched back to the original standard that was used by the terminal prior to being captured. Furthermore, the encryption key(s) for the original standard may be derived from the lower-generation encryption key(s). However, even with the derived key(s), it may not be possible to intermediate voice communication between the terminal and the original cellular network, as the original network may reset the encryption key(s) upon the interrogation device connecting to the network.

To address this challenge, embodiments of the present disclosure switch the terminal back to the original standard and derive the encryption key(s) for this standard as described above, but keep the interrogation device connected to the lower-generation network. Subsequently, the interrogation device uses the lower-generation key(s) to encrypt and decrypt voice communication between the network and the interrogation device, and the derived key(s) to encrypt and decrypt voice and data communication between the interrogation device and the terminal.

For example, a terminal originally connected to a third-generation (3G) network may be captured and switched to the second-generation (2G) standard. Subsequently to breaking the 2G encryption and thus obtaining the 2G Session Key (Kc), the interrogation device may switch the terminal back to 3G, and derive the 3G Cipher Key (CK) and Integrity Key (IK) from the Kc. Subsequently, the interrogation device may use the Kc, CK, and IK to intermediate communication between the terminal and a 2G network.

In some embodiments, the terminal is switched to a standard belonging to a generation even higher than that of the original standard. Due to superior performance (e.g., higher data rates) in the higher generation, the user is even less likely to notice that the terminal was captured.

For example, after switching the terminal back to 3G and deriving the 3G keys from the 2G key as described above, the interrogation device may switch the terminal to the fourth-generation (4G) standard and derive a 4G Key Access Security Management Entries ($K_{ASME}$) key from the 3G keys. Subsequently, the interrogation device may use the 2G and 4G keys to intermediate communication between the terminal and a 2G network. Alternatively, the interrogation device may break the encryption in the original standard (without switching the terminal to a lower generation), switch the terminal to a higher generation, and then intermediate voice communication between the terminal and the original network. For example, given a terminal originally connected to a 3G network, the interrogation device may break the 3G encryption, switch the terminal to 4G, derive the 4G key from the 3G keys, and then intermediate voice communication between the terminal and the 3G network using the 3G and 4G keys.

System Description

Reference is initially made to FIG. 1, which is a schematic illustration of a system 20 for intermediating cellular voice communication, in accordance with some embodiments of the present disclosure.

FIG. 1 shows two mobile communication networks, each including one or more base transceiver stations (BTSs) 40: an $M^{th}$-generation network 32M, which uses an $M^{th}$-generation communication standard, and an $N^{th}$-generation network 32N, which uses an $N^{th}$-generation communication standard. FIG. 1 assumes N to be greater than M.

For example, network 32M may be a 2G network, which uses the Global System for Mobile communication (GSM) standard, and network 32N may be a 3G network, which uses the Universal Mobile Telecommunications System (UMTS) standard, or a 4G network, which uses the Long Term Evolution (LTE) standard. Alternatively, for example, network 32M may be a 3G network, and network 32N may be a 4G network.

Notwithstanding the simplified illustration in FIG. 1, it is noted that the mobile communication networks include additional components not shown in FIG. 1, such as core networks. Moreover, different respective BTSs serving network 32M and network 32N may be contained in the same physical structure (e.g., tower).

FIG. 1 further shows a user 36 of a mobile communication terminal 38, which is assumed to be initially connected to network 32N. Terminal 38 may include a cellular phone, for example.

System 20 comprises an interrogation device 22 comprising a processor 24, at least one modem 26, a first antenna 30a, at least one transceiver (TCVR) 28, and a second antenna 30b. Modem 26 is configured to exchange wireless communication via first antenna 30a, and transceiver 28 is configured to exchange wireless communication via second antenna 30b.

Typically, interrogation device 22 further comprises a memory 25, which may comprise any suitable type of volatile or non-volatile memory. Alternatively or additionally, interrogation device 22 may comprise another modem 27, which is configured to exchange data over a computer network 29, such as the Internet.

Processor 24 is configured to cause transceiver 28 to imitate a BTS 40, such that terminal 38 disconnects from network 32N, as indicated in FIG. 1 by a disconnect indicator 34, and connects, instead, to transceiver 28. For example, the processor may solicit the terminal by causing the transceiver to transmit a signal at a relatively high power level, such that the transmission from the transceiver is received by the terminal at a signal strength that is stronger than that of transmission from any BTS 40 belonging to network 32N. Alternatively or additionally, the received signal strength may be increased using directional transmission from second antenna 30b.

To facilitate the imitation of a BTS 40, transceiver 28 may comprise hardware for transmitting and processing the various layers of cellular communication. Alternatively or additionally, the transceiver may comprise a separate processor configured to execute firmware or software for performing this functionality.

Subsequently, as described in detail below with reference to FIGS. 2-3, processor 24 obtains one or more $M^{th}$-generation keys used by the terminal to communicate in accordance with the $M^{th}$-generation communication standard. For example, for M=2, the processor may obtain Kc. For M=3, the processor may obtain CK and IK.

Next, the processor computes (or "derives") one or more $P^{th}$-generation keys, which are used by the terminal to communicate in accordance with a $P^{th}$-generation communication standard, from the $M^{th}$-generation keys. In some cases, P>N, such that P−M≥1. In other cases, P=N, such that the $P^{th}$-generation communication standard is the $N^{th}$-generation communication standard. (In this latter case, too, P−M may be greater than one.)

Subsequently, the processor causes the terminal to communicate with the transceiver in accordance with the $P^{th}$-generation communication standard. The processor also causes modem 26 to impersonate the terminal with respect to network 32M.

Subsequently, the processor intermediates voice communication between terminal 38 and network 32M. In particular, using the $M^{th}$-generation keys, the processor encrypts and decrypts $M^{th}$-generation packets of the voice communication exchanged between the modem and network 32M. Using the $P^{th}$-generation keys, the processor encrypts and decrypts $P^{th}$-generation packets of the voice communication exchanged between the terminal and transceiver 28.

For example, using the $M^{th}$-generation keys, the processor may decrypt a packet received from network 32M via modem 26. (The decrypted packet may be stored in memory 25 and/or communicated to another computer via modem 27.) The processor may then re-encrypt the packet using the $P^{th}$-generation keys, and communicate the re-encrypted packet, via transceiver 28, to the terminal. Subsequently, using the $P^{th}$-generation keys, the processor may decrypt a packet received from the terminal via the transceiver. (The decrypted packet may be stored and/or communicated as described above.) The processor may then re-encrypt the packet using the $M^{th}$-generation keys, and communicate the re-encrypted packet, via modem 26, to network 32M.

In other cases, N=M, such that the $M^{th}$-generation communication standard is the $N^{th}$-generation communication standard. For example, N and M may equal three, such that network 32M (which, in this case, is identical to network 32N) is a 3G network. In such cases, P−M≥1.

Typically, while intermediating the voice communication, the processor, using transceiver 28, intermediates data communication between the terminal and network 29. For example, data received from the terminal via transceiver 28 may be decrypted using the $P^{th}$-generation keys and then communicated, via modem 27, over network 29. Similarly, data received from network 29 via modem 27 may be encrypted using the $P^{th}$-generation keys and then communicated, via transceiver 28, to the terminal.

In general, processor 24 may be embodied as a single processor, or as a cooperatively networked or clustered set of processors, including one or more processors located remotely from interrogation device 22.

The functionality of processor 24 may be implemented solely in hardware, e.g., using one or more fixed-function or general-purpose integrated circuits, Application-Specific Integrated Circuits (ASICs), and/or Field-Programmable Gate Arrays (FPGAs). Alternatively, this functionality may be implemented at least partly in software. For example, processor 24 may be embodied as a programmed processor comprising, for example, a central processing unit (CPU) and/or a Graphics Processing Unit (GPU). Program code, including software programs, and/or data may be loaded for execution and processing by the CPU and/or GPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Example Algorithms

Figure 2:
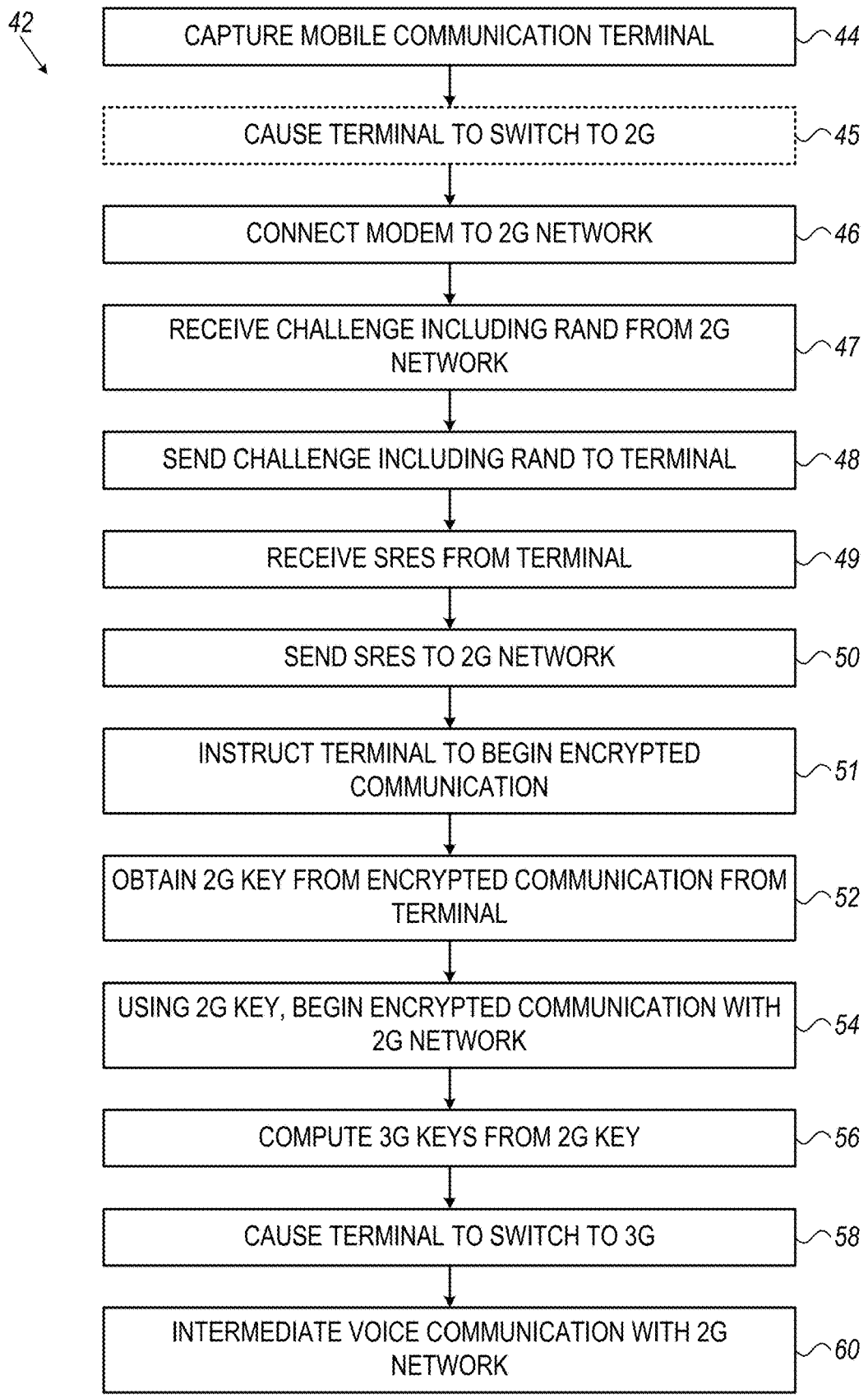
FIGS. 2-3 are flow diagrams for algorithms for intermediating cellular voice communication, in accordance with some embodiments of the present disclosure.

Reference is now made to FIG. 2, which is a flow diagram for an algorithm 42 for intermediating cellular voice communication with a 2G network, in accordance with some embodiments of the present disclosure.

Algorithm 42 begins with a capturing step 44, at which processor 24 captures terminal 38 (FIG. 1). In other words, the processor causes the terminal to disconnect from network 32N (FIG. 1) and to connect, instead, to transceiver 28, which imitates a legitimate $N^{th}$-generation BTS, where N≥2.

Next, if N>2, the processor, at a switching-to-2G step 45, causes the terminal to switch to 2G, such that the terminal begins exchanging 2G communication with the transceiver.

For example, the processor may instruct the terminal to switch to 2G in accordance with an inter-Radio Access Technology (inter-RAT) handover protocol.

Subsequently, at a 2G-connecting step 46, the processor connects modem 26 (FIG. 1) to a 2G network (an instance of network 32M of FIG. 1). To perform this connection, the modem may present any suitable identifier of the terminal to the 2G network so as to appear to be the terminal. Suitable identifiers include an International Mobile Subscriber Identity (IMSI), a Temporary Mobile Subscriber Identity (TMSI), and a Mobile Station International Subscriber Directory Number (MSISDN).

In response to the connection of the modem to the 2G network, the 2G network communicates, to the modem, an authentication challenge including a Random Challenge (RAND) parameter. The processor thus receives the challenge, via the modem, at a 2G-challenge-receiving step 47. The processor then sends (via the transceiver) another authentication challenge, including the RAND, to the terminal, at a 2G-challenge-sending step 48.

In response to receiving the authentication challenge, the terminal computes a Signed Response (SRES) parameter and communicates this parameter to the transceiver. The processor thus receives the SRES, via the transceiver, at an SRES-receiving step 49. Subsequently, the processor, at an SRES-sending step 50, sends the SRES (via the modem) to the 2G network, thereby completing the authentication of the modem to the 2G network. The processor then instructs the terminal, at an instructing step 51, to begin encrypted communication, such that the processor begins to receive encrypted 2G communication from the terminal. Similarly, the 2G network instructs the modem to begin encrypted communication.

Subsequently, at a 2G-key-obtaining step 52, the processor obtains the 2G key (Kc) used by the terminal, by cryptanalysis of the received communication. For example, the processor may execute a ciphertext-only attack as described in Barkan et al., "Instant ciphertext-only cryptanalysis of GSM encrypted communication," Annual international cryptology conference, Springer, Berlin, Heidelberg, 2003, whose disclosure is incorporated herein by reference. Alternatively, the processor may obtain the 2G key using any suitable technique described in any one of the following references, whose respective disclosures are incorporated herein by reference:

(i) Bogdanov, Andrey, et al., "A hardware-assisted real-time attack on A5/2 without precomputations," International Workshop on Cryptographic Hardware and Embedded Systems, Springer, Berlin, Heidelberg, 2007.

(ii) Biryukov, Alex, and Adi Shamir, "Cryptanalytic time/memory/data tradeoffs for stream ciphers," International Conference on the Theory and Application of Cryptology and Information Security, Springer, Berlin, Heidelberg, 2000.

(iii) Gendrullis, Timo, et al., "A real-world attack breaking A5/1 within hours," International Workshop on Cryptographic Hardware and Embedded Systems, Springer, Berlin, Heidelberg, 2008.

(iv) Kostrzewa, Adam, "Development of a man in the middle attack on the GSM Um-Interface," Apr. 15, 2011, Master thesis, Technische Universitat Berlin.

Alternatively, the processor may derive the 2G key from authentication vectors communicated over the Signaling System 7 (SS7) network, as described below with reference to FIG. 3.

In some embodiments, SRES-sending step 50 is performed after instructing step 51, such as after 2G-key-obtaining step 52.

Subsequently to obtaining the 2G keys, the processor, via the modem, uses the 2G keys to begin encrypted communication with the 2G network, at a communication-beginning step 54.

Next, at a 3G-key-computing step 56, the processor computes 3G keys (CK and IK) from the 2G key. In other words, the processor converts the 2G key to 3G keys, using a conversion function described, for example, in Annex B.3 and B.4 of the 3rd Generation Partnership Project (3GPP) Technical Specification 33.102, which is incorporated herein by reference. (Alternatively, 3G-key-computing step 56 may be performed even before communication-beginning step 54.)

Subsequently, at a switching-to-3G step 58, the processor causes the terminal to switch to 3G, such that the terminal begins exchanging encrypted 3G communication with the transceiver. For example, the processor may instruct the terminal to switch to 3G in accordance with an inter-RAT handover protocol.

Finally, at an intermediating step 60, the processor intermediates voice communication between the terminal and the 2G network, by using the 2G key to encrypt and decrypt communication between the modem and the 2G network, and using the 3G keys to encrypt and decrypt communication between the terminal and the transceiver.

Although FIG. 2 assumes that P=3 (and hence, that N 3), it is noted that algorithm 42 may be adapted to cases in which P (and N) are greater than three by including, in the algorithm, the appropriate key-computing and switching steps.

In particular, for cases in which P−M>1, the terminal typically cannot switch directly from the $M^{th}$ generation to the $P^{th}$ generation. Hence, prior to causing the terminal to switch to the $P^{th}$-generation communication standard, the processor causes the terminal to switch to an $L^{th}$-generation communication standard, where M<L<P. For example, for M=2 and P=4, the processor may cause the terminal to switch to 3G before switching to 4G. For M=2 and P=5, the processor may cause the terminal to switch to 3G and then to 4G before switching to 5G.

In such cases, the processor may compute the $P^{th}$-generation key(s) in any number of steps, using any suitable conversion function(s). For example, for M=2 and P=4, the processor may compute 3G keys from the 2G key as described above, and then a 4G key ($K_{ASME}$) from the 3G keys, e.g., by applying a conversion function described in Annex A.2 of the 3GPP Technical Specification 33.401, which is incorporated herein by reference. As another example, for M=3 and P=5, the processor may compute a 5G authentication and security network function key (KAUSF) from the 3G keys, e.g., using a conversion function described in Annex A.2 of the 3GPP Technical Specification 33.501, which is incorporated herein by reference.

Figure 3:
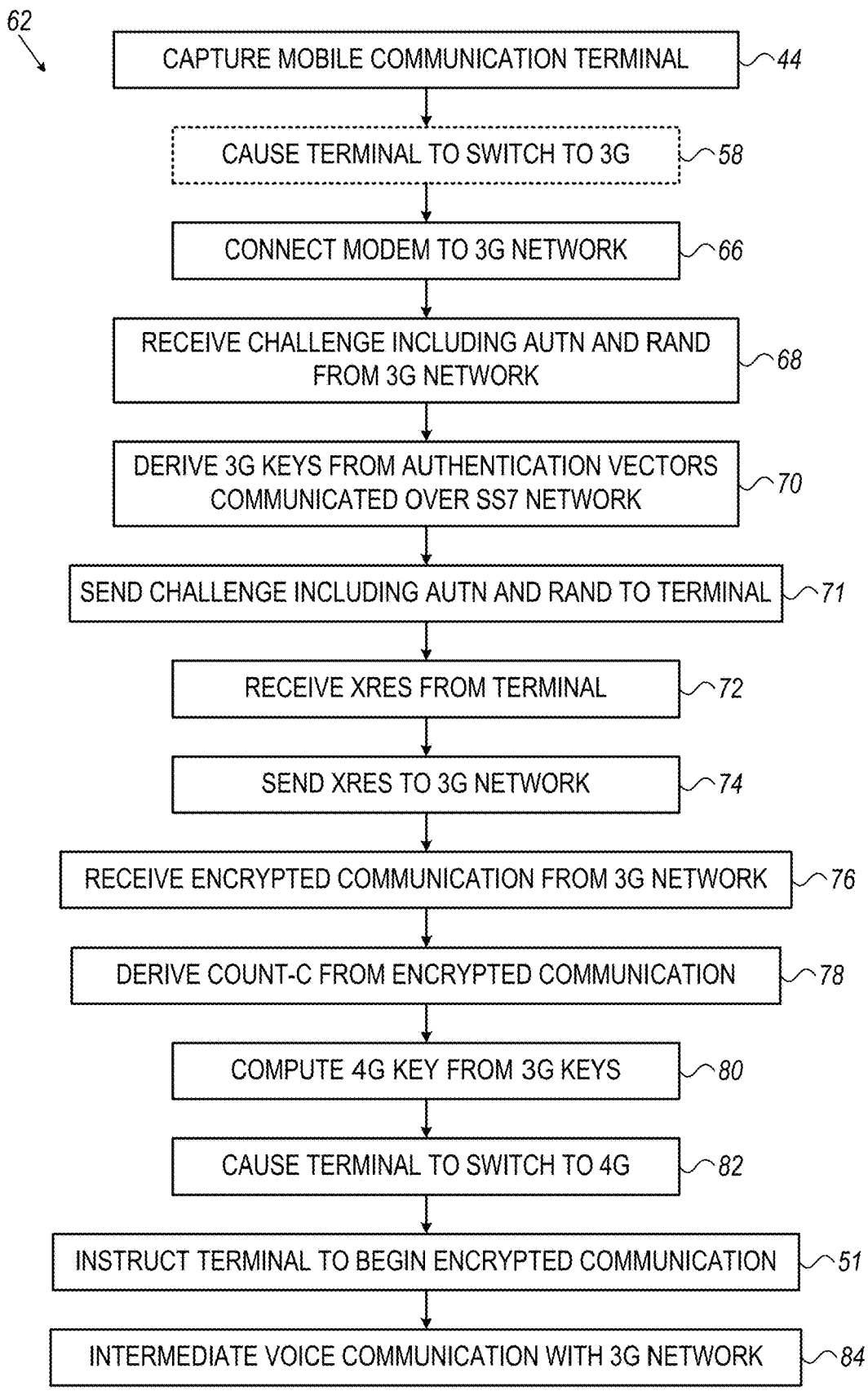

Reference is now made to FIG. 3, which is a flow diagram for an algorithm 62 for intermediating cellular voice communication with a 3G network, in accordance with some embodiments of the present disclosure.

Algorithm 62 begins with capturing step 44, at which processor 24 captures terminal 38 (FIG. 1) from network 32N, where N≥3. Next, if N>3, the processor, at switching-to-3G step 58, causes the terminal to switch to 3G, e.g., in accordance with an inter-Radio Access Technology (inter-RAT) handover protocol. Subsequently, at a 3G-connecting step 66, the processor connects modem 26 (FIG. 1) to a 3G network (an instance of network 32M of FIG. 1) by presenting any suitable identifier of the terminal to the 3G network.

In response to the connection of the modem to the 3G network, the 3G network communicates, to the modem, an authentication challenge including a User Authentication Token (AUTN) parameter and a RAND parameter. The processor thus receives the challenge, via the modem, at a 3G-challenge-receiving step 68.

Subsequently, the processor, at a 3G-key-obtaining step 70, obtains the 3G keys assigned, by the Home Location Register (HLR) server serving the 3G network, to the terminal in response to the modem impersonating the terminal. In particular, the processor first receives, via the SS7 network, a plurality of authentication vectors that were assigned, by the HLR server, to the terminal. Subsequently, the processor derives the 3G keys from the authentication vectors by correlating between the authentication vectors and the authentication challenge received at 3G-challenge-receiving step 68.

In some embodiments, the authentication vectors are received from an imitation Visitor Location Register (VLR), which obtains access to the SS7 network and then uses an SS7 protocol to obtain the authentication vectors from the HLR server over the SS7 network. (For example, per the Mobile Application Part (MAP) SS7 protocol, the imitation VLR may communicate a "sendIdentification" message to the HLR server.) In other embodiments, the authentication vectors are received from a probe (or "tap") that monitors communication between the HLR server and a legitimate VLR over the SS7 network. These techniques for obtaining authentication vectors are further described in co-assigned US Patent Application Publication 2020/0382322 to Goldfarb, whose disclosure is incorporated herein by reference.

The obtained authentication vectors include a current authentication vector, which includes the current keys required to communicate with the network, and other authentication vectors, which contain keys for future use. In correlating between the authentication vectors and the authentication challenge, the processor identifies the authentication vector including the parameters received in the authentication challenge, and extracts the current keys from this vector. Such a correlation is described, for example, in co-assigned US Patent Application Publication 2020/0107195 to Goldfarb, whose disclosure is incorporated herein by reference.

In particular, each 3G authentication vector includes five parameters: RAND, AUTN, an Expected Response (XRES), CK, and IK. The processor therefore extracts CK and IK from whichever authentication vector contains the RAND and AUTN received at 3G-challenge-receiving step 68.

It is noted that 3G-key-obtaining step 70 may alternatively be performed after one or more of the steps described below.

Subsequently, at a 3G-challenge-sending step 71, the processor sends (via the transceiver) an authentication challenge, including the AUTN and RAND, to the terminal. In response to receiving the challenge, the terminal computes an XRES parameter and communicates this parameter to the transceiver. The processor thus receives the XRES, via the transceiver, at an XRES-receiving step 72.

Subsequently, the processor, at an XRES-sending step 74, sends the XRES (via the modem) to the 3G network, thereby completing the authentication of the modem to the 3G network. (Alternatively, the processor may obtain the XRES at 3G-key-obtaining step 70, and therefore perform XRES-sending step 74 even before receiving the XRES from the terminal.) Next, the processor, via the modem, receives encrypted communication from the 3G network at a communication-receiving step 76.

In 3G, a 32-bit ciphering sequence number known as "Count-C," which includes a HyperFrame Number (HFN) typically including 20-25 bits, is required, in addition to CK, for computing the keystream block used for encryption and decryption. Hence, to facilitate a continued exchange of encrypted communication with the 3G network, the processor, at a Count-C-deriving step 78, derives the Count-C parameter from the received encrypted communication. For example, the processor may iteratively calculate different respective keystream blocks from multiple candidate HFNs, use each of the keystream blocks to decrypt the communication, and identify the keystream block that correctly decrypts the communication. Such an iterative process is described, for example, in co-assigned U.S. Pat. No. 10,999,070 to Langer and Leibovich, whose disclosure is incorporated herein by reference.

Next, at a 4G-key-computing step 80, the processor computes the 4G key ($K_{ASME}$) from the 3G keys. Subsequently, at a switching-to-4G step 82, the processor causes the terminal to switch to 4G, e.g., in accordance with an inter-RAT handover protocol. The processor then instructs the terminal, at instructing step 51, to begin encrypted communication. Finally, at another intermediating step 84, the processor intermediates voice communication between the terminal and the 3G network, by using the 3G keys to encrypt and decrypt communication between the modem and the 3G network, and using the 4G key to encrypt and decrypt communication between the terminal and the transceiver.

Although FIG. 3 assumes that P=4 (and hence, that N≤4), it is noted that algorithm 62 may be adapted to cases in which P (and N) are greater than 4 by including, in the algorithm, the appropriate key-computing and switching steps, as described above with reference to FIG. 2. Furthermore, algorithm 62 may be adapted to cases in which M>3, given that the keys for generations higher than 3G may likewise be derived from authentication vectors communicated over the SS7 network.

It will be appreciated by persons skilled in the art that the present disclosure is not limited to what has been particularly shown and described hereinabove. Rather, the scope of embodiments of the present disclosure includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A system, comprising:
   a transceiver;
   a modem; and
   a processor, configured to:
   cause the transceiver to imitate a base transceiver station (BTS) such that a mobile communication terminal disconnects from a BTS of a mobile communication network, and connects to the transceiver, wherein the terminal connects to the transceiver in an original generation communication standard in use by the terminal prior to connection to the transceiver;
subsequently to the terminal connecting to the transceiver, cause the terminal to switch to a lower generation communication standard, wherein the lower generation communication standard is less than the original generation communication standard and is at least one of:
second-generation (2G);
third-generation (3G); or
fourth-generation (4G);
obtain one or more generation keys of the lower generation communication standard used by the terminal to communicate in accordance with the lower generation communication standard;
compute one or more higher generation keys, which are used by the terminal to communicate in accordance with a higher generation communication standard, wherein the higher generation communication standard is either the original generation communication standard or a generation communication standard that is higher than the original communication standard, and the higher generation communication standard is at least one of the following:
3G;
4G; or
fifth generation (5G);
subsequently to computing the one or more higher generation keys, cause the terminal to switch to the higher generation communication standard; and
exchange and intermediate voice communications as follows:
between the terminal and the transceiver by using the higher generation keys, and encrypting and decrypting higher generation packets of the voice communication; and
between the modem and the mobile communication network, wherein the modem impersonates the terminal with respect to the mobile communication network, by using the lower generation keys and encrypting and decrypting lower generation packets of the voice communication.

2. The system according to claim 1,
wherein the lower generation communication standard is 2G and 2G keys include a 2G Session Key (Kc), and
wherein the processor is configured to obtain the 2G keys by cryptanalysis of encrypted 2G communication from the terminal to the transceiver.

3. The system according to claim 1, wherein the processor is configured to obtain lower generation keys by:
receiving, via a Signaling System 7 (SS7) network, a plurality of authentication vectors that were assigned, by a Home Location Register (HLR) server serving the lower generation mobile communication network, to the terminal in response to the modem impersonating the terminal; and
by correlating between the authentication vectors and an authentication challenge received by the modem from the lower generation mobile communication network, deriving the lower generation keys from the authentication vectors.

4. The system according to claim 1, wherein the lower generation communication standard is 3G and the lower generation keys include a 3G Cipher Key (CK) and a 3G Integrity Key (IK).

5. The system according to claim 1, wherein the processor is further configured to, while intermediating the voice communication, using the transceiver, intermediate data communication between the terminal and a computer network.

6. The system according to claim 1, wherein the lower generation standard is more than one generation from the original generation communication standard, and wherein the processor is further configured to, prior to causing the terminal to switch to the higher generation communication standard, cause the terminal to switch to an intermediate generation communication standard, between the lower and higher generation communication standards.

7. A method, comprising:
causing a transceiver to imitate a base transceiver station (BTS) such that a mobile communication terminal disconnects from the BTS of a mobile communication network, and connects to the transceiver, wherein the terminal connects to the transceiver in an original generation communication standard in use by the terminal prior to connection to the transceiver;
subsequently to the terminal connecting to the transceiver, causing the terminal to switch to a lower generation communication standard, wherein the lower generation communication standard is less than the original generation communication standard and is at least one of:
second generation (2G);
third generation (3G); or
fourth generation (4G);
obtaining one or more generation keys of the lower generation communication standard used by the terminal to communicate in accordance with the lower generation communication standard;
computing one or more higher generation keys, which are used by the terminal to communicate in accordance with a higher generation standard, wherein the higher generation communication standard is either the original generation communication standard or a generation communication standard that is higher than the original generation communication standard, and the higher communication is at least one of the following:
3G;
4G; or
fifth generation (5G);
subsequently to computing the one or more higher generation keys, causing the terminal to switch to the higher generation communication standard; and
exchanging and intermediating voice communications as follows:
between the terminal and the transceiver by using the higher generation keys, and encrypting and decrypting higher generation packets of the voice communication; and
between the modem and the mobile communication network, wherein the modem impersonates the terminal with respect to the mobile communication network, by using the lower generation keys, and encrypting and decrypting lower generation packets of the voice communication.

8. The method according to claim 7,
wherein the lower generation communication standard is 2G and 2G keys include a 2G Session Key (Kc), and
wherein obtaining the 2G keys comprises obtaining the 2G keys by cryptanalysis of encrypted 2G communication from the terminal to the transceiver.

9. The method according to claim 7, wherein obtaining the lower generation keys comprises:
receiving, via a Signaling System 7 (SS7) network, a plurality of authentication vectors that were assigned, by a Home Location Register (HLR) server serving the lower generation mobile communication network, to the terminal in response to the modem impersonating the terminal; and by correlating between the authentication vectors and an authentication challenge received by the modem from the lower generation mobile communication network, deriving the lower generation keys from the authentication vectors.

10. The method according to claim 7, wherein the lower generation communication standard is 3G and the lower generation keys include a 3G Cipher Key (CK) and a 3G Integrity Key (IK).

11. The method according to claim 7, further comprising, while intermediating the voice communication, using the transceiver, intermediating data communication between the terminal and a computer network.

12. The method according to claim 7, wherein the lower generation standard is more than one generation from the original generation communication standard, and wherein the method further comprises, prior to causing the terminal to switch to the higher generation communication standard, causing the terminal to switch to an intermediate generation communication standard, between the lower and higher generation communication standards.

13. A computer software product comprising a tangible non-transitory computer-readable medium in which program instructions are stored, which instructions, when read by a processor, cause the processor to:

cause a transceiver to imitate a base transceiver station (BTS) such that a mobile communication terminal disconnects from a BTS of a mobile communication network, and connects to the transceiver, wherein the terminal connects to the transceiver in an original generation communication standard in use by the terminal prior to connection to the transceiver;

subsequently to the terminal connecting to the transceiver, cause the terminal to switch to a lower generation communication standard, wherein the lower generation communication standard is less than the original generation communication standard and is at least one of:
second-generation (2G);
third-generation (3G); or
fourth-generation (4G);

obtain one or more generation keys of the lower generation communication standard used by the terminal to communicate in accordance with the lower generation communication standard;

compute one or more higher generation keys, which are used by the terminal to communicate in accordance with a higher generation communication standard, wherein the higher generation communication standard is either the original generation communication standard or a generation communication standard that is higher than the original communication standard, and the higher generation communication standard is at least one of the following:
3G;
4G; or
fifth generation (5G);

subsequently to computing the one or more higher generation keys, cause the terminal to switch to the higher generation communication standard; and exchange and intermediate voice communications as follows:
between the terminal and the transceiver by using the higher generation keys, and encrypting and decrypting higher generation packets of the voice communication; and
between the modem and the mobile communication network, wherein the modem impersonates the terminal with respect to the mobile communication network, by using the lower generation keys and encrypting and decrypting lower generation packets of the voice communication.

14. The computer software product according to claim 13, wherein the lower generation communication standard is 2G and 2G keys include a 2G Session Key (Kc), and wherein the instructions cause the processor to obtain the 2G keys by cryptanalysis of encrypted 2G communication from the terminal to the transceiver.

15. The computer software product according to claim 13, wherein the instructions cause the processor to obtain the lower generation keys by:

receiving, via a Signaling System 7 (SS7) network, a plurality of authentication vectors that were assigned, by a Home Location Register (HLR) server serving the lower generation mobile communication network, to the terminal in response to the modem impersonating the terminal; and by correlating between the authentication vectors and an authentication challenge received by the modem from the lower generation mobile communication network, deriving the lower generation keys from the authentication vectors.

16. The computer software product according to claim 13, wherein the instructions further cause the processor to, while intermediating the voice communication, using the transceiver, intermediate data communication between the terminal and a computer network.

* * * * *